Nov. 8, 1949  J. A. CAVALLIER  2,487,424
CENTERING CHUCK FOR CENTRIFUGAL CASTING MACHINES
Filed Dec. 30, 1946
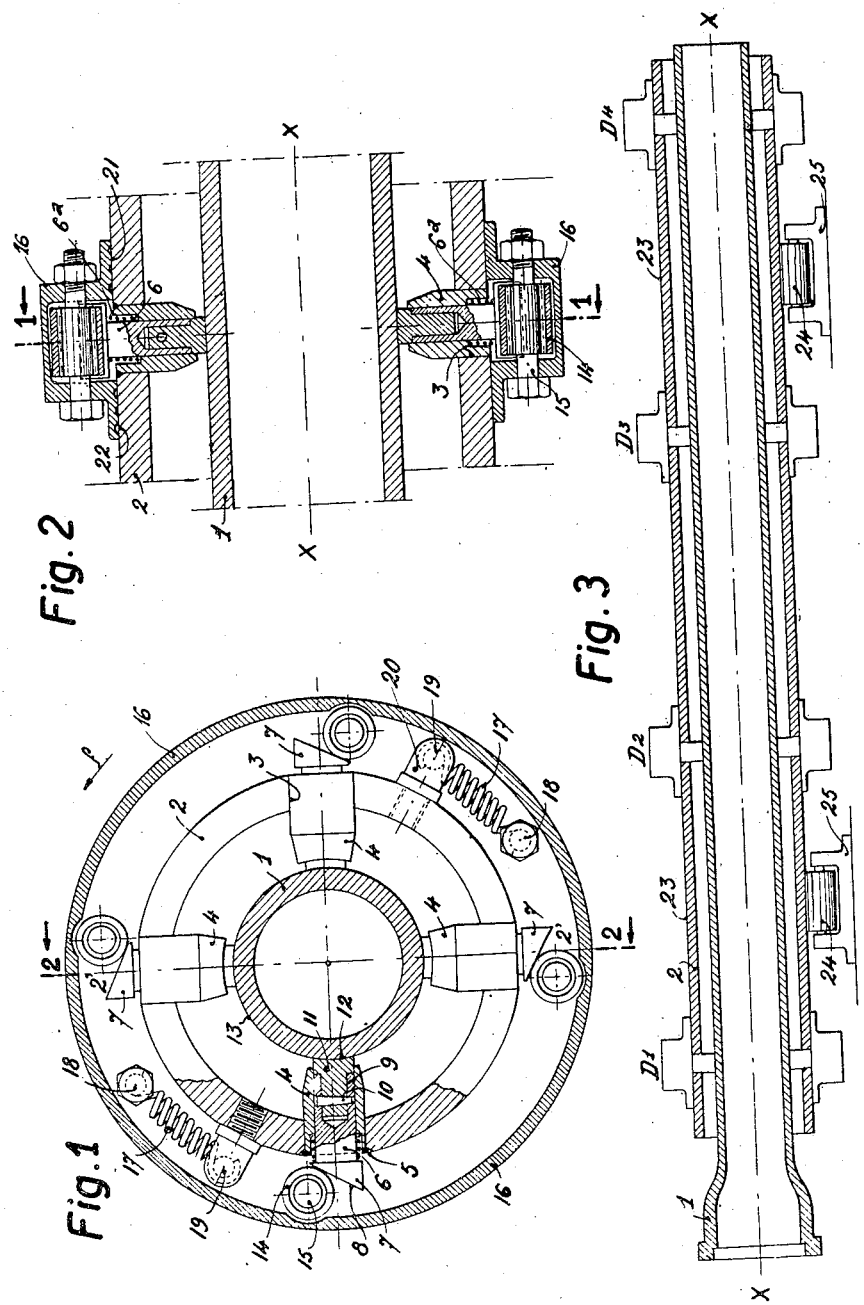
JEAN ALBERT CAVALLIER
INVENTOR Patented Nov. 8, 1949

2,487,424

UNITED STATES PATENT OFFICE 2,487,424

CENTERING CHUCK FOR CENTRIFUGAL CASTING MACHINES

Jean Albert Cavallier, Nancy, France, assignor to Societe Pompes Noel, Liverdun, France, a French company Application December 30, 1946, Serial No. 782,899
In France December 8, 1945

Section 1, Public Law 690, August 8, 1946
Patent expires December 8, 1965

4 Claims. (Cl. 22—65)

1

In the casting of pipes or similar objects by centrifugation, use is made of a mold placed inside a reinforcing concentric jacket; one of those two parts rolling on rollers and acting as a support for the other.

Due to the high speed of rotation of the whole apparatus, it is essential that the mold and the jacket be strictly concentric. According to known processes, this result is obtained by means of a series of set screws, fitted at regular intervals on the circumference and on the length of the jacket through which they pass for pressing upon the outer surface of the mold.

Adjustment of those screws is an extremely lengthy and delicate operation, because concentricity of the two parts must be obtained with precision to the extent of one hundredth of a millimeter. Furthermore, longitudinal and radial dilatations of the mold when casting, displace the mold in relation to its jacket and as a result, there are frequent irregularities in their concentricity.

The object of the present invention is an improved device or chuck for centering a mold inside a support jacket making it possible to overcome the afore-mentioned drawbacks.

The improved chuck comprises angularly spaced pressing members or slides sliding radially in the jacket and adapted to press upon the mold and a centering ring arranged around the jacket and engaging with cam surfaces provided on the slides, whereby the latter are simultaneously and uniformly pressed radially upon the core when the said centering ring is displaced.

The contact between the cam surfaces and the centering ring is preferably maintained by springs connecting the jacket to the centering ring and the cam surfaces preferably cooperate with rollers carried by the centering ring.

Other characteristics and advantages will result from the following description.

In the accompanying drawing, given solely by way of an example,

Fig. 1 is a transverse section along the line I—I of Fig. 2, of a centering device in accordance with the invention;

Fig. 2 is a longitudinal section, along the line 2—2'—2'—2 of Fig. 1;

Fig. 3 is a diagrammatical longitudinal section of a mold and its jacket, fitted with a series of devices according to the invention.

As shown in Figs. 1 and 2, the device is intended to center a cylindrical mold I in a cylindrical jacket 2. The jacket 2 is provided with series of radial holes 3 in which cylinders or sleeves 4 are

2 secured by any desired means, for instance by welding as shown at 5, or by screws.

In each sleeve 4 is guided radially a piston 6 provided with an outer head 7 terminated by an inclined or cam surface 8. At its inner end, the piston 6 carries a pressing shoe 11 secured for instance by means of a cylindrical extension 9 and a cotter pin 10. The end surface 12 of that shoe is cylindrical and corresponds to the outer surface 13 of the mold I.

Each radial slide comprising the piston 6 and shoe 11 is urged outwardly by a spring 6ª (Fig. 2) bearing under the head 7.

In engagement with the cam surfaces 8 of all the pistons 6 are rollers 14 carried by axes 15 provided on a centering ring 16 which has a U cross section and is rotatably supported on the jacket 2.

One or several coil springs 17, are attached on the one hand to the ring at 18 and on the other hand at 19 to the jacket 2, through the medium of yoke members 20 which springs urge the ring 16 to turn in the direction of the arrow $f$; the effect of this is to apply the rollers 14 on the cam surfaces 8 whereby the shoes 11 are pressed on the outer surface 13 of the mold I.

As shown in Fig. 2, the centering ring 16 is preferably provided with lateral cylindrical flanges 21 which bear upon the jacket 2 and are provided with grooves 22 forming baffles to prevent dust from penetrating to the interior of the device.

The operation is as follows: In order to fix and center the mold I in the jacket 2 or inversely, the centering ring 16 is turned in a direction opposite to that of the arrow $f$ so as to liberate to a certain extent, the pistons 6 which are urged outwardly by their springs 6ª. In that way, the mold I can be introduced into the jacket 2. The ring 16 is then left to itself and, under the action of the spring or springs 17, the rollers 14 engage with the cam surfaces 8 whereby the shoes 11 are simultaneously pressed in close contact, concentrically, with the outer surface 13 of the part I. The latter is thus centered automatically and accurately, in relation to the jacket 2.

Fig. 3 shows the mold I and the jacket 2. Those two parts are made to rotate around their common axis XX. The jacket 2 rolls at 23, on rollers 24, supported by bearings 25.

Distributed along the length of the jacket 2 are provided a certain number of centering devices $D^1$, $D^2$, $D^3$, $D^4$.

Owing to an adequate inclination of the cam surface 8 of the heads 7 of the pistons 6, and to the reversibility so obtained the mold 1 can expand during the casting operation, pushing away the shoes 11 and pistons 6. The latter will cause the ring 16 to revolve in the opposite direction to the arrow f (Fig. 1) in opposition to the action of the spring or springs 17.

As the mold 1 resumes its initial temperature and dimensions, the spring or springs 17 make the ring 16 return in the direction of the arrow f (Figure 1). The effect of this is to maintain the contact of the mold with the shoes and to ensure permanence of the centering without hindrance of the radial dilations of the mold, which would not be the case with a non-reversible device.

It will be noted that the longitudinal expansion of the mold can take place freely, which is not the case with known devices in which, due to the radial expansion of the mold, the latter finds itself jammed between its fixed wedging screws thus preventing it from expanding freely in the longitudinal direction.

Naturally, the invention is not limited to the construction, shown and described.

For instance, the centering ring 16, instead of being fitted so as to rotate around the jacket 2, can slide along the same, the heads of the pistons and the rollers being set perpendicularly to the direction shown in the Figures 1 and 2.

The rollers 14 carried by the centering ring can be mounted on ball-bearings, rollers or needles or can be replaced by usual cam members. The rollers could also be fitted to the pistons and cooperate with cams carried by the centering ring.

The shoes 11 can be made of metal or of any other material offering, preferably, a low coefficient of friction against the mold so as to facilitate longitudinal sliding of that mold, at the moment of the expansions. For instance, the shoes can be made of a known material composed of synthetic resins reinforced with cotton.

In each device, the number of shoes can be varied and the slides can be placed in the same radial planes or in different planes, from one set to the other when several sets D¹, D², D³, D⁴ are provided along the length of the mold as shown in Fig 3.

The number and shape of the springs 17 can be variable.

The space existing between the mold 1 and the jacket 2 can be filled with a cooling liquid and, in that case, the pistons can be fitted with watertight joints of a known type.

The jacket and the whole centering device can also be made to dip in a water chamber.

Having now described my invention what I claim as new and desire to secure by Letters Patent is:

1. A centering chuck for a centrifugal casting machine of the type having a jacket rotating with a mold centered within the jacket, comprising pressing members disposed at circumferentially spaced points about said jacket, said members being radially movable with respect to said jacket, one end of each of said members being supported in said jacket in yielding contact with said mold, the other end of each of said pressing members projecting above said jacket and having on its end a surface inclined with respect to the radius on which the member moves, a ring disposed about said jacket, being rotatable in opposite directions with respect to said jacket and having means for engaging said inclined surfaces, and yielding means connected to said jacket and ring for yieldingly urging said engaging means against said inclined surfaces to force said pressing members against the mold by rotating the ring in one direction, said yielding means allowing the ring to reverse its direction of rotation when the thermal expansion of the mold acting through said members tends to force the ring in the opposite direction.

2. A device according to claim 1, in which the ring comprises a channel-shaped member mounted on the jacket, and the engaging means comprises rotatable rollers seated in said channel.

3. A centering chuck for a centrifugal casting machine of the type having a jacket rotating with a mold centered within the jacket, comprising a plurality of sockets fixed to said jacket, disposed at circumferentially spaced points about said jacket and projecting inwardly thereof towards the mold, a pressing shoe slidable in each of said sockets having a mold engaging face at one end, and an enlarged head at the other end, said enlarged head forming a shoulder above said jacket, said head having a face on its upper surface inclined with respect to the longitudinal axis of the pressing shoe; each socket having a counterbore at its upper end and a spring seated in said counterbore and engaging the shoulder on said pressing shoe for yieldingly supporting said shoe in said socket; a ring about said jacket, rotatable in opposite directions with respect thereto and having means therein for engaging said inclined surfaces, and yieldable means connecting said jacket and ring for yieldingly urging said engaging means against said inclined surfaces to force said pressing shoes against the mold by rotating the ring in one direction; said yielding means allowing the ring to reverse its direction of rotation when the thermal expansion of the mold, acting through said shoes, tends to force the ring in the opposite direction.

4. A device according to claim 3 in which the ring comprises a channel-shaped member mounted on said jacket, and said engaging means comprises rotatable rollers supported in said channel; said ring and rollers simultaneously pressing all of said pressing shoes into engagement with said mold.

JEAN ALBERT CAVALLIER.

REFERENCES CITED

The following references are of record in the file of this patent:

UNITED STATES PATENTS

| Number | Name | Date |
|---|---|---|
| 1,024,172 | Bergsten | Apr. 23, 1912 |
| 1,485,860 | Ladd | Mar. 4, 1924 |
| 1,681,085 | Beatty | Aug. 14, 1928 |
| 1,740,377 | Snyder et al. | Dec. 17, 1929 |
| 2,123,037 | Carrington | July 5, 1938 |

FOREIGN PATENTS

| Number | Country | Date |
|---|---|---|
| 492,240 | Great Britain | Sept. 16, 1938 |